United States Patent [19]

Baker

[11] 4,289,964
[45] Sep. 15, 1981

[54] RADIATION INSPECTION SYSTEM FOR A MATERIAL MAKING APPARATUS AND METHOD USING A BETA RAY GAUGE

[75] Inventor: Cole H. Baker, Westport, Conn.

[73] Assignee: Intec Corporation, Trumbull, Conn.

[21] Appl. No.: 114,901

[22] Filed: Jan. 24, 1980

[51] Int. Cl.³ .............................................. G01N 23/00
[52] U.S. Cl. ..................................... 250/308; 250/359
[58] Field of Search ................... 250/308, 358 R, 359, 250/571, 572

[56] References Cited

U.S. PATENT DOCUMENTS

| | | | |
|---|---|---|---|
| 3,681,595 | 8/1972 | Dahlin | 250/308 |
| 3,806,730 | 4/1974 | Tirkkonen et al. | 250/359 |
| 3,822,383 | 7/1974 | Beckage et al. | 250/308 |
| 4,037,104 | 7/1977 | Allport | 250/308 |

Primary Examiner—Alfred E. Smith
Assistant Examiner—Janice A. Howell
Attorney, Agent, or Firm—Parmelee, Johnson, Bollinger & Bramblett

[57] ABSTRACT

The beta ray gauge is augmented with a radiation inspection system for automatically improving products formed into a continuous web such as non-woven paper, non-woven textiles, plastics, etc. For example, the basis weight of a continuous web of paper is measured by passing the web through a beta ray gauge which generates a first signal based on the weight of the paper web. The first signal generated by the beta ray gauge is compared with a predetermined preset reference signal representing the basis weight desired. After the beta ray gauge measures the basis weight in the paper making process, a light inspection system applies a light source across the paper web and detects the light emanating therefrom to provide a second signal based on the characteristics of the paper web. The light inspection system continuously generates the second signal across the entire width of the web, and accordingly rapidly inspects the entire web with greater spatial resolution than the beta gauge which is stationary or slow moving. The first and second signals are compared producing a control signal which is used to regulate the dispensing of the paper stock forming the continuous paper web or to otherwise monitor and grade the continuous web output.

5 Claims, 5 Drawing Figures

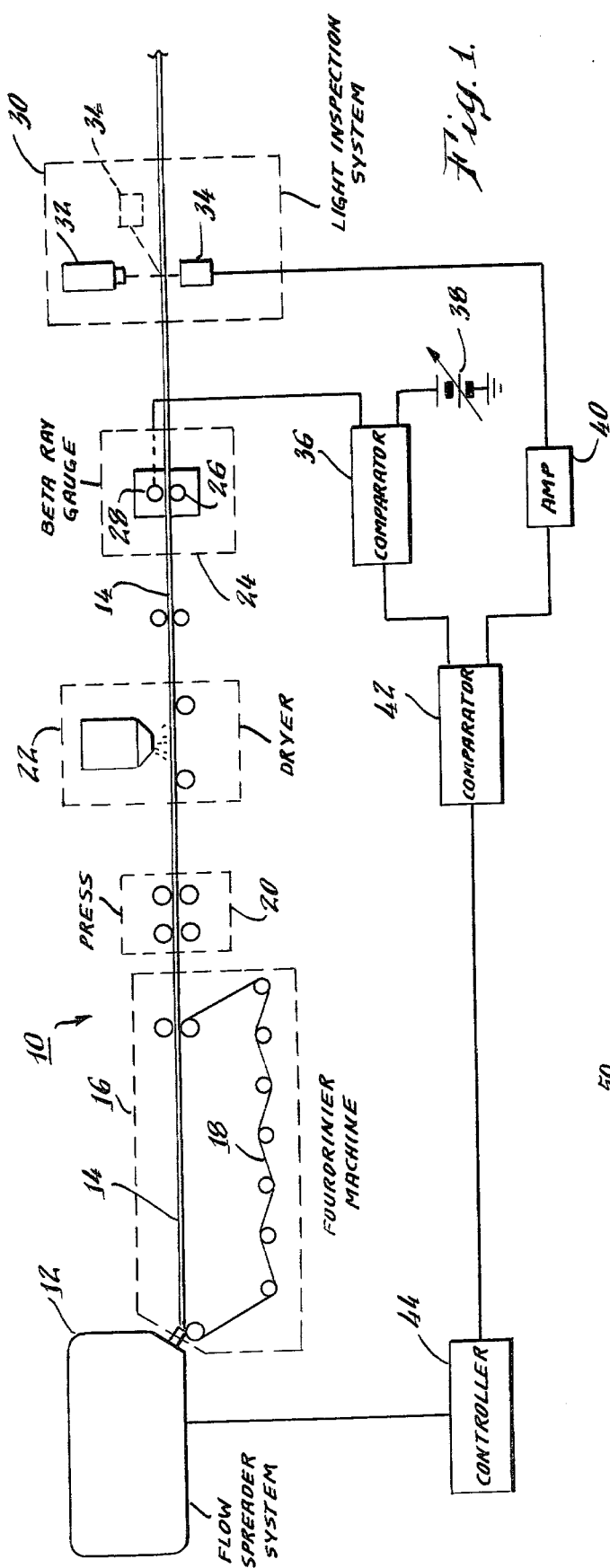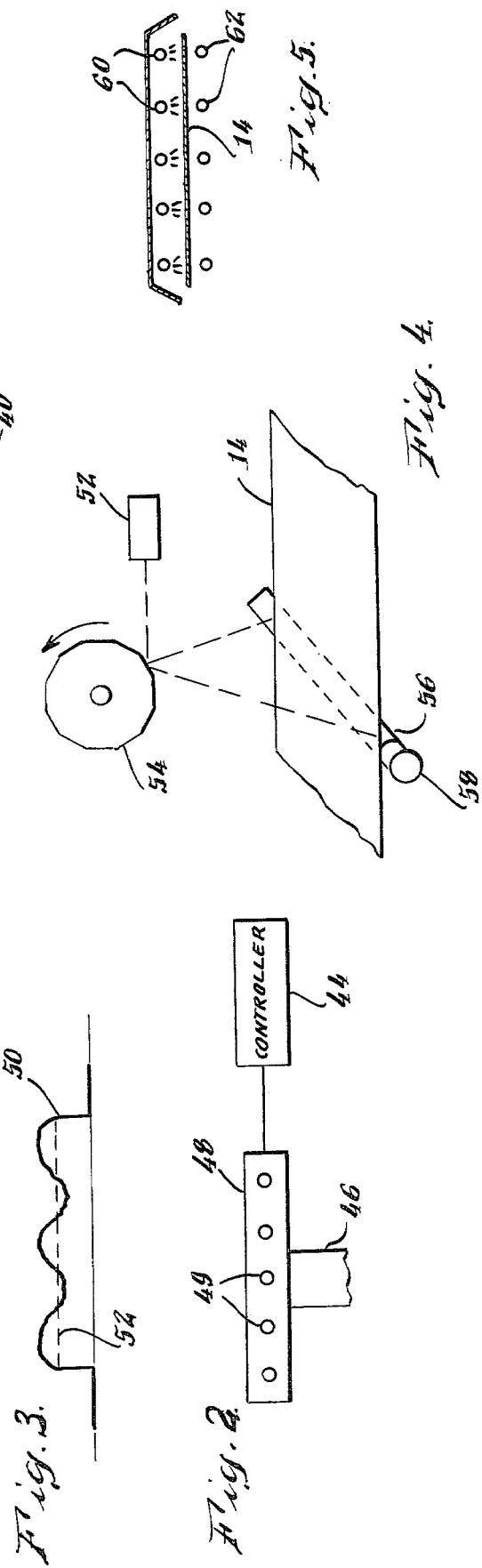

1

RADIATION INSPECTION SYSTEM FOR A MATERIAL MAKING APPARATUS AND METHOD USING A BETA RAY GAUGE

BACKGROUND OF THE INVENTION

This invention relates to an apparatus and method utilizing a beta gauge for regulating the production of a continuous web of material such as paper, and more particularly to the augmentation of such a system with a radiation inspection system which continuously monitors the entire web and compares the signal generated thereby with the signal generated by the beta ray gauge in order to control the formation of the web of material being produced.

Generally, the paper making process involves spreading the stock formed of a slurry of water suspended fibers on a wire mesh in the form of a cylinder or table. The wire mesh forms a support and provides drainage through it. The stock is applied to the wire mesh by a flowspreader which converts a flowing stream of stock into a flat thin stream having a uniform velocity across the width of the machine. The web so formed on the wire mesh is passed through a press section which removes more of the water and then applied to a dryer section where the remainder of the moisture is removed.

The paper making process is implemented with the foregoing as well as other apparatus being incorporated in huge paper making machines which operate continuously and turn out tons of paper products. Although the paper making process performed by the machines has had the production process computerized, the paper making art is still empirical by nature. Accordingly, any improved methods of controlling the uniformity and product quality of the paper produced by the paper mill would be highly desirable.

One of the measures which is used in the quality control process is the basis weight of the resulting paper product. One way of determining the basis weight is to use a beta ray gauge which includes a measuring head which is suspended on a monorail and so positioned that the continuous web of paper is passed through a gap in the beta ray gauge. The beta ray gauge includes a beta ray source which passes radiation through the web to a detector which includes an ionization chamber for detecting the beta rays passed by the paper web. As the weight of the paper product increases, fewer beta rays reach the detector and as the weight decreases, more beta rays are detected. The detected signals are automatically compared with a reference signal which has been preset for the weight desired. The difference between the two signals is measured and deviations above and below the desired weight indicate a heavy or light sheet. Automatic correction then can be applied by coupling a controller which makes the comparison to a stock valve, gate positioners, or consistent regulators of the flowspreader for controlling the dispensing of the paper stock on the wire mesh.

However, one of the problems of this approach is that the beta ray gauge measures only a sample area on the continuous web, and accordingly any comparison made would only be valid for that particular sample. Some of the paper processes accordingly provide a scanning beta ray gauge. However, the problem with this approach is that the gauge moves slowly and does not cover the entire width of the continuous web and even if the gauge did scan the entire area of the web, the cloud chamber response time of the gauge detector is so slow that changes in basis weight across the web as well as down web cannot be measured. Additionally, the minimum spot size obtainable by a practical beta ray gauge is relatively large, e.g. on the order of 0.125" while spot sizes of 0.010" and smaller are practical with an optical scanner allowing for measurement of formation as well as basis weight. Formation is the fiberous structure and relates directly to how well paper can be printed, coated, its tear strength and its visual appearance.

SUMMARY OF THE INVENTION

Accordingly, it is an object of this invention to provide a new and improved method and apparatus for more accurately determining and controlling the basis weight of products produced in continuous web form.

In carrying out this invention in one illustrative embodiment thereof, a method and apparatus for controlling the production of non-woven products is provided using a beta ray gauge in conjunction with a radiation inspection system. Means are provided for forming a continuous web of material. A beta ray gauge is utilized for measuring the basis weight of the continuous web and generating a first signal based on the weight of the web. The first signal from the beta ray gauge is compared with a predetermined reference signal preset for the weight desired to produce a difference signal. After inspection by the beta ray gauge, the web is inspected by a radiation inspection system by applying a source of radiation across the web and detecting the radiation emanating therefrom to provide a second signal which is also based on the characteristics of the paper web. The difference signal from the beta ray gauge as well as the second signal generated by the radiation inspection system are compared to derive a control signal which may be utilized either manually or automatically in regulating the dispensing of the stock forming the continuous web.

Advantageously, a stationary or slow moving beta ray gauge is augmented by a fast response time radiation inspection system which rapidly and continuously inspects the web over the entire area of the web to provide a much more accurate control over the weight, and accordingly, the characteristics of the resulting product.

BRIEF DESCRIPTION OF THE DRAWINGS

FIG. 1 is a schematic block diagram illustrating one form of paper making machinery in functional block form embodying the present invention.

FIG. 2 is a side elevational view illustrating a gate controller which may be utilized in the flowspreader system illustrated in FIG. 1 for controlling the formation of the paper web.

FIG. 3 is a waveform of an electrical signal of the type produced by the comparative 42 of FIG. 1 which is useful in illustrating the manner in which the system may be controlled.

FIG. 4 illustrates one type of radiation inspection system which may be utilized in the paper machine of FIG. 1.

FIG. 5 illustrates another form of radiation inspection system which may be utilized in the paper making process illustrated in FIG. 1.

DESCRIPTION OF THE PREFERRED EMBODIMENTS

The present invention is directed to any process or apparatus for forming non-woven materials, such as paper, textiles, plastic films, etc. into continuous webs which employ a beta ray gauge for measuring the basis weight of the output. The invention is described and illustrated in connection with paper which is one of its important applications. Accordingly, one form of paper making machinery and process are described for purposes of illustration, but it will be appreciated that other types of machinery and processes may be utilized pursuant to the teachings of this invention.

Referring now to FIG. 1, a paper making mill or machine is provided and referred to generally with the reference character 10. The paper machine 10 includes a flowspreader system 12 which is fed with a paper stock consisting of a slurry of water suspended fibers. Flowspreader 12 provides a means for converting a flowing stream of paper stock which is carried thereto in a pipe into a flat, thin stream having a uniform velocity across the width of the paper machine 10. The flowspreader normally includes a headbox element which further smooths out the velocity variations in the incoming stream of paper stock and is designed to control the turbulence level in the stock before it reaches the forming stage.

The flowspreader system 12 applies the paper stock to a moving, woven wire mesh 18 which is designed to control the rate and method of drainage of the water in the stock through the wire. Continuous paper web 14 is thus formed on the wire mesh 18 of what is generally referred to as a Fourdrinier machine 16. The Fourdrinier machine as stated has a wire mesh belt which is supported on a series of rolls and other drainage control devices in a horizontal position during the draining process. Fourdrinier machine 16 has various forms and may include top wires which are not illustrated. Furthermore, as pointed out, the present invention is not limited to the use of a Fourdrinier machine and has equal application to other wire mesh type supporting systems such as a cylindrical machine in which the stock is applied to the outside of a roll by means of a "vat".

A continuous web 14 is passed from the Fourdrinier machine 16 through a press 20 where some of the water in the slurry is removed from the web 14 and the balance in the dryer section 22. With the bulk of the moisture removed, the web 14 is passed through a beta ray gauge 24 having a detector 28 positioned on one side of the web 14 and a beta ray source 26 positioned on the other side thereof in alignment with the detector 28. The beta ray gauge 24 functions to measure the basis weight of the continuous paper web 14. Generally, the beta ray gauge 24 is suspended on a monorail (not shown) and is so positioned that the web 14 passes through a gap in the device between the beta ray source 26 and the detector 28. As the weight of the web 14 increases, fewer rays reach the detector, and as the weight decreases, more rays are detected producing a larger detector output signal. The output of the detector 28 is connected to a comparator 36 which also has a source of reference potential 38 applied thereto. Accordingly, the detected rays from the beta ray source 26 are applied from the detector 28 to the comparator and are automatically compared with the reference source 38 which has been preset for the weight desired for the paper web 14. The difference signal between the reference signal 38 and the detector signal 28 provides an output for the comparator 36 which is indicative of whether a heavy or light web is provided.

In conventional systems, the comparator output may be utilized to correct the weight of the paper web by applying the difference signal from comparator 36 to a controller which is utilized in some way to control the flowspreader system which dispenses the paper stock. This provides, however, only one point on the web, and if the web happens to be unusually thick at the measured point but is thinner on other portions and uneven, faulty correction will be provided. Furthermore, even if the beta ray gauge scans the web, the movement is to slow to provide anything more than a course adjustment to the flow rates provided by the flowspreader system 12.

In accordance with the present invention, a light inspection system 30 (which may include selective infrared or ultraviolet light waves) is utilized to augment the beta ray gauge 14. The light inspection system 30 includes a light source 32 which is applied across the continuous web 14. A receiver 34 is positioned in alignment with the light source 32 in order to receive radiation emanating from the light source 32 which passes through the web. The signal generated by the receiver 34 provides an indication of the transmissive qualities of the web which in effect will also depend on the basis weight of the web. The detected output of the receiver 34 is amplified by an amplifier 40 and applied to a comparator 42 along with the difference signal from the beta ray gauge 24 at the output of the comparator 36. The output of comparator 42 is illustrated in FIG. 2 by a waveform 50 which indicates uneven thickness of the paper web 14 by the portions of waveform 50 extending above a representative level 52 which is the desired thickness and basis weight of the continuous web 14. The waveform 50 from comparator 42 is applied to a controller 44 which controls the output of the flowspreader system 12 across the entire width of the web so that a more uniform paper product is provided. The automatic correction of weight can be attained by tying the controller 44 into a stock valve, gate positioners, consistency regulators, etc. which control the uniform distribution of the paper stock onto the paper machine 16.

FIG. 1 illustrates the use of a transmission type inspection system. However, since increasing the density of the web would increase the reflection from the web for some materials, a reflective type system may be employed for some applications in which case the receiver would be positioned above the web 14 to receive the reflected radiation emanated from the web caused by the scanning of the light source 32 thereon. Whether a reflection or a transmission type mode of operation for the light inspection system is used will depend on the type of material being formed into a web and the particular application.

FIG. 3 illustrates the use of a gate controller 48 with the paper stock being fed through a pipe 46 therein to a plurality of orifices 49 which are controlled by the controller 44. Accordingly, the size or openings in the orifices 49 are controlled by the controller 44 in accordance with the signal 50. Since the signal 50 can be divided into lanes, each of which contains an orifice 49, the entire width of the web may be controlled.

It will be apparent that the type of control which will be employed will depend on the specific type of flowspreader system and the various structure therein which evenly spreads the paper stock on the wire mesh 18 in the paper making process.

As is illustrated in FIG. 4, the light inspection system is preferably in a form of a laser scanner in which a laser beam from a laser 52 is scanned by a rotating drum 54 across the web 14 which would constitute the light source 32 as illustrated in FIG. 1. The receiver portion 34 illustrated in FIG. 1, as shown in FIG. 4 comprises a light collecting rod 56 and a suitable detector such as a photomultiplier tube 58 on one end thereof which detects radiation from the laser beam passed by the web 14.

Alternatively, as shown in FIG. 5, the light inspection system may include a plurality of stationary sources 60 spaced along the top of the web 14 and a plurality of cooperating photodetectors 62 which are spaced along the underside of the web 14. It will also be apparent that the light sources 60 may constitute a single source which covers the entire width of the web or a single light source can be scanned across the top of the web utilizing the fixed photocells 62 below for detection purposes. The light source also may be in selective infrared and ultraviolet ranges to accommodate the inspection of different types of webs. Also, as has been pointed out heretofore, the light inspection system may be operated in the reflection mode.

By augmenting the beta ray gauge with a light inspection system, the benefits of both systems are utilized for actively controlling the web forming process. The accuracy of the beta ray gauge at one specific area is augmented by the light inspection source which covers the entire area of the web. Since the web 14 is moving, the web is repetitively, rapidly scanned by the light inspection system which cannot otherwise be accomplished by the beta ray gauge per se which cannot cover the full area of web, or be scanned fast enough or provide the required spatial resolution to provide the desired control.

Although the system illustrated employs an automatic correction in the forming process using a closed loop control system, it should be appreciated that the signals derived may be displayed and used in other ways, e.g. manual control, quality ratings on output, etc.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

What is claimed is:

1. A method of controlling the production of paper products using a beta ray gauge in conjunction with a light inspection system for inspecting a moving web of formed paper material comprising the steps of:
    dispensing paper stock onto a wire support for forming a continuous paper web,
    sampling the basis weight of the continuous paper web so formed by passing said web through a beta ray gauge which generates a first signal based on the weight of the paper web where measured by the beta ray gauge,
    comparing the first signal from the beta ray gauge with a predetermined reference signal preset for the weight desired to produce a difference signal,
    continuously inspecting the entire paper web with a light inspection system by applying a light source across the paper web and detecting light emanating therefrom to provide a second signal based on the light transmitting or reflecting characteristics of said paper web,
    comparing said difference and second signals and deriving a control signal therefrom, and
    regulating the dispensing of paper stock forming said continuous paper web using said control signal for controlling the basis weight of said continuous paper web.

2. In a paper making apparatus for the production of paper products from a paper stock of water suspended fibers which is spread and formed into a continuous paper web on a wire support comprising:
    a beta ray gauge,
    means for passing said continuous paper web by said beta ray gauge for generating a first signal representing the weight of said paper web on the area measured,
    a reference signal preset for the desired weight of said paper web,
    means for comparing said first signal with said reference signal to provide a difference signal,
    a light source applied across the width of said paper web,
    light detection means positioned with respect to said web for receiving radiation emanating from said web as a result of said light source being applied thereto for generating a second signal based on the light reflecting or transmitting characteristics across the width of said web,
    means for comparing said second signal with said difference signal to provide a control signal,
    means for using said control signal to control the basis weight of said continuous paper web.

3. In an apparatus for the production of products which are formed by spreading or extruding stock in a continuous moving web of material comprising:
    a beta ray gauge,
    means for passing said continuous web by said beta ray gauge for generating a first signal representing the weight of said web on the area measured,
    a predetermined reference signal which is preset to represent the desired weight of said web,
    means for comparing said first signal with said reference signal to provide a difference signal,
    a source of light radiation,
    means for continuously applying said light source across the entire width of said web,
    detection means positioned with respect to said web for receiving radiation emanating from said web as a result of said radiation source being applied thereto for generating a second signal,
    means for comparing said second signal with said difference signal to derive a control signal therefrom,
    means for using said control signal to control the weight of said continuous web.

4. In the apparatus set forth in claim 3 wherein said detection means is positioned below said web in alignment with said source of radiation for detecting the transmission of radiation through said web.

5. In the apparatus set forth in claim 3 wherein said detection means is positioned above said web of material and is positioned to receive reflected radiation from said source applied to said web for detecting reflected radiation from said web.

* * * * *